(12) United States Patent
Cao et al.

(10) Patent No.: US 8,140,841 B2
(45) Date of Patent: Mar. 20, 2012

(54) METHOD AND MICRO-SYSTEM FOR UPDATING CONFIGURATIONS OF TARGET SYSTEM IN COMPUTER

(75) Inventors: Rui Xin Cao, Beijing (CN); Le He, BeiJing (CN); Xing Jin, BeiJing (CN); Pei Ni Liu, BeiJing (CN); Qing Bo Wang, Beijing (CN); Ying Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 697 days.

(21) Appl. No.: 12/265,703

(22) Filed: Nov. 5, 2008

(65) Prior Publication Data

US 2009/0119499 A1    May 7, 2009

(30) Foreign Application Priority Data

Nov. 5, 2007    (CN) .......................... 2007 1 0165844

(51) Int. Cl.
*G06F 15/177*    (2006.01)
*G06F 9/24*    (2006.01)
(52) U.S. Cl. .................. 713/2; 713/1; 709/222
(58) Field of Classification Search ........... 713/2
See application file for complete search history.

(56) References Cited

U.S. PATENT DOCUMENTS

| | | | |
|---|---|---|---|
| 6,272,629 B1 * | 8/2001 | Stewart | 713/2 |
| 6,999,748 B2 * | 2/2006 | White | 455/406 |
| 7,069,428 B2 * | 6/2006 | Miyamoto et al. | 713/1 |
| 7,185,335 B2 * | 2/2007 | Hind et al. | 717/176 |
| 7,543,048 B2 * | 6/2009 | Rothman et al. | 709/222 |
| 2002/0078200 A1 * | 6/2002 | Helms | 709/225 |

FOREIGN PATENT DOCUMENTS

CN    101008895 A    8/2007

* cited by examiner

*Primary Examiner* — Suresh Suryawanshi
(74) *Attorney, Agent, or Firm* — Ido Tuchman; William J. Stock

(57) ABSTRACT

A technique for updating configurations of a target system in a computer. The method comprises booting, based on Preboot Execution Environment technology, a micro-system for updating configurations of a target system before booting the target system, the micro-system performing the steps of: (a) acquiring target configuration packages via a network from a server; (b) extracting target configuration data from said target configuration packages; and (c) updating the configurations of said target system by using said target configuration data, wherein said micro-system is independent of said target system.

18 Claims, 3 Drawing Sheets

METHOD AND MICRO-SYSTEM FOR UPDATING CONFIGURATIONS OF TARGET SYSTEM IN COMPUTER

CROSS-REFERENCE TO RELATED APPLICATIONS

This application claims priority under 35 U.S.C. §119 to Chinese Patent Application No. 200710165844.1 filed Nov. 5, 2008, the entire text of which is specifically incorporated by reference herein.

BACKGROUND OF THE INVENTION

The present invention generally relates to the field of computer technology, and in particular to a method and a micro-system for updating configurations of a target system in a computer.

With the rapid development of computer technology and network technology, global computer users can sufficiently share network resources using networks. However, computer viruses might spread over networks. Viruses usually invade computers via networks and attack computers using bugs in computer operating systems. This makes computer operating systems vulnerable to viruses.

To avoid virus attacks to computer operating systems, various computer virus protection measures have been proposed in the prior art, such as virus protection tools, firewalls, etc. In addition, it is usually necessary to download operating system patches, update virus protection software and a virus database thereof in time so as to patch bugs in operating systems and enhance the virus protection capability in time and further make computer systems more secure. Specifically, computer operating system patches and virus databases, which have been released recently, generally include protection components for latest virus attacks.

Generally, to obtain update packages that include recently released computer operating system patches and virus databases, it is necessary to connect a computer system to a network so as to download these update packages via the network from a server. However, viruses might invade the computer operating system during downloading. Hence, the computer operating system might be infected with viruses before or during update packages are downloaded and installed.

Therefore, there is a special need in the prior art for a method of securely downloading operating system patches or software profiles to update configurations of the operating system.

BRIEF SUMMARY OF THE INVENTION

According to an aspect of the present invention, there is provided a method for updating configurations of a target system in a computer. The method can comprise booting, based on Preboot Execution Environment technology, a micro-system for updating configurations of a target system before booting the target system, the micro-system performing the steps of: (a) acquiring target configuration packages via a network from a server; (b) extracting target configuration data from said target configuration packages; and (c) updating configurations of said target system by using said target configuration data, wherein said micro-system is independent of said target system.

According to another aspect of the present invention, there is provided a micro-system for updating configurations of a target system in a computer. The micro-system can comprise: acquisition unit for acquiring target configuration packages via a network from a server; extraction unit for extracting target configuration data from said target configuration packages; and configuration updating unit for updating configurations of said target system by using said target configuration data, wherein said micro-system is independent of said target system, and before said target system is booted, each unit in said micro-system is booted and operated based on Preboot Execution Environment technology so as to update configurations of said target system.

Computer viruses usually invade an operating system by using the operating system's processes, threads or services. Since the method and micro-system of the present invention are independent of a target operating system and do not perform any process or processing except downloading and installing patches, computer viruses can hardly invade the operating system using the micro-system and method of the present invention to download and update operating system patches or software profiles, and thus higher security is provided.

BRIEF DESCRIPTION OF THE SEVERAL VIEWS OF THE DRAWINGS

The features and advantages of the present invention will become more apparent from the following detailed description, when taken in conjunction with the accompanying drawings in which.

Like reference numerals denotes the same or similar parts throughout the drawings.

DETAILED DESCRIPTION OF THE INVENTION

The basic principle of the present invention is to construct in a computer system a micro-system independent of an operating system, wherein before the operating system is booted, the micro-system downloads operating system patches or software profiles from a server via a network or from a local storage device directly, and then updates the operating system using the operating system patches or software profiles.

Detailed description will be given to embodiments of the present invention with reference to the accompanying drawings below. It should be noted that each embodiment of the present invention is considered only as illustrative and not limited.

Figure 1:
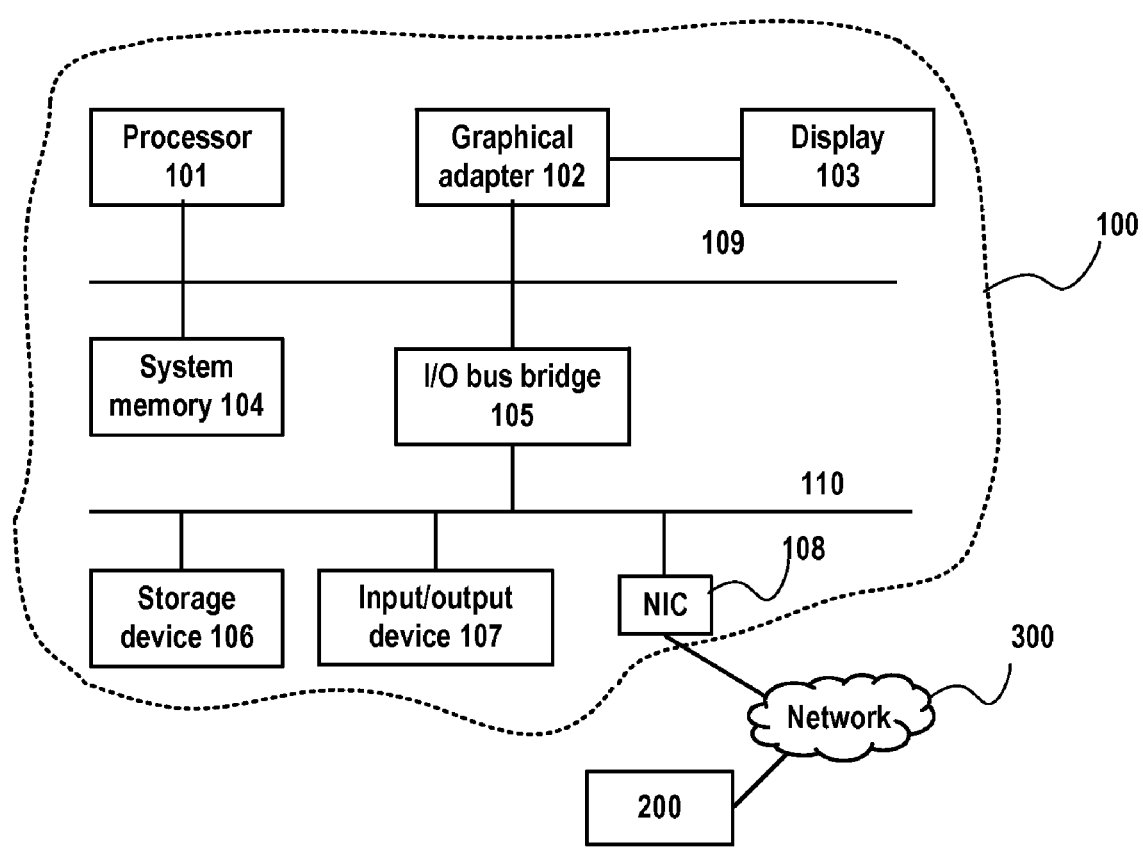
FIG. 1 shows a block diagram of a computer system architecture in which the present invention can be applied.

Reference is first made to FIG. 1 that shows a block diagram of a computer system architecture in which the present invention can be applied.

In the computer system architecture shown in FIG. 1, a client 100 can be connected to a server 200 via a network 300.

Client 100 may be a general-purpose personal computer, which comprises a processor 101, a graphical adapter 102, a display 103, a system memory 104, an I/O bus bridge 105, a storage device 106, an input/output device 107 and a network interface card 108 (NIC). Specifically, processor 101, graphical adapter 102, system memory 104 and I/O bus bridge 105 are connected to a system bus 109. I/O bus bridge 105 is connected between system bus 109 and an input/output bus 110. Additionally, peripheral devices such as storage device 106 and input/output device 107 are connected to input/output bus 110. Each component in client 100 is well known, and detailed description thereof is omitted here.

Target configuration packages, such as recently released computer operating system patches, recently released virus databases and other update packages, are resident on server 200.

Network 300 in FIG. 1 can be an intranet. However, it should be appreciated to those skilled in the art that network 300 can also be a local area network, a metropolitan area network, the Internet or other network. Client 100 can be connected to network 300 by NIC 108 so as to perform data communication with server 200 via network 300.

It should be appreciated to those skilled in the art that constitutive components within the computer system architecture can be added or omitted according to needs of practical applications.

Hereinafter, a structure of a micro-system for updating configurations of a target system according to an embodiment of the present invention will be described in detail with reference to FIG. 2.

Figure 2:
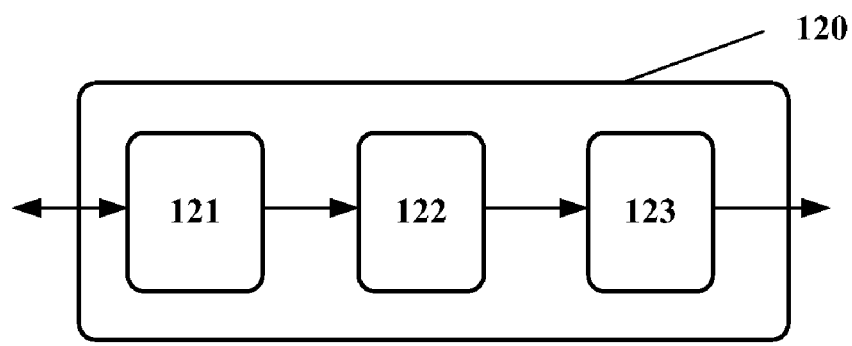
FIG. 2 shows a block diagram of a micro-system for updating configurations of a target system according to an embodiment of the present invention.

As shown in FIG. 2, micro-system 120 can comprise acquisition unit 121, extraction unit 122 and configuration updating unit 123.

Specifically, acquisition unit 121 can acquire target configuration packages of the target system. The Target configuration packages can comprise one or more update packages, such as recently released computer operating system patch packages, recently released virus databases, etc.

Usually, said package contains configuration data, such as a target configuration update policy, target configuration content and the like. The target configuration content can indicate each configuration and its post-update status, such as a specific configuration item and its target configuration value, involved during updating configurations of the target system. The target configuration update policy can be a basis on which the micro-system performs target configuration update, which indicates a manner which is used to update a specific configuration of the target system, such as a specific order in which a specific file is replaced, deleted or rewritten.

Target configuration packages can be stored in a specific configuration data server, such as server 200. In this way, acquisition unit 121 can acquire target configuration packages from server 200 via network 300. Of course, it should be appreciated to those skilled in the art that target configuration packages can also be stored in other local storage device, such as an optical disc, floppy disc, flash memory and other nonvolatile storage device. Acquisition unit 121 can acquire target configuration packages from these local storage devices.

Extraction unit 122 can extract configuration data, including target configuration content, configuration update policy etc., from acquired target configuration packages.

Configuration updating unit 123 can update configurations of the target system, such as replace, delete, rewrite a file in the target system and modify a registry on storage device 106 (computer readable memory, based on the configuration update policy and target configuration content.

Preferably, micro-system 120 can further comprise analysis unit (not shown). The analysis unit analyzes a target configuration package needed by the target system. Then, acquisition unit 121 acquires the target configuration package needed by the micro-system based on a result from the analysis. In this way, micro-system 120 according to the present invention can acquire a needed target configuration packages only, which reduces the workload of the client and improves the work efficiency thereof.

Figure 3:
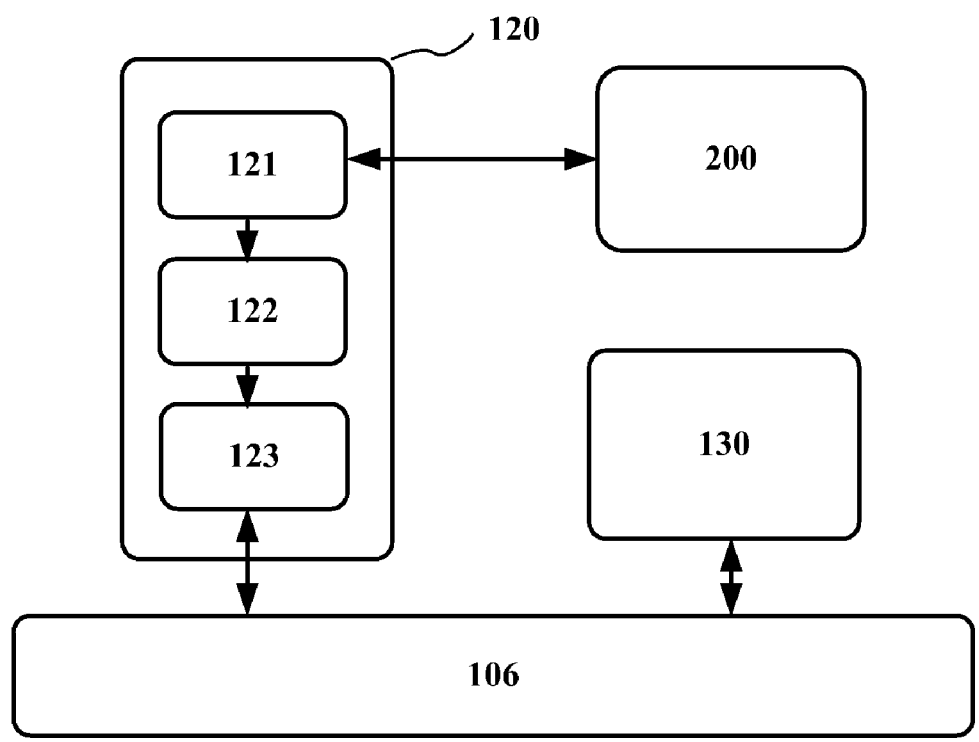
FIG. 3 shows a simplified schematic view of a computer system in which a micro-system according to an embodiment of the present is employed.

FIG. 3 shows a simplified schematic view of a computer system in which a micro-system according to an embodiment of the present invention is employed.

As shown in FIG. 3, the computer system can comprise micro-system 120 according to the present invention and a commonly used target operating system 130, such as Microsoft XP etc. As is clear from FIG. 3, micro-system 120 according to the present invention is independent of target operating system 130, i.e. operates beyond target operating system 130. Usually, before target operating system 130 is booted, micro-system 120 updates target operating system 130 stored on storage device 106 by using target configuration data acquired from server 200 or other local storage device, whereby configurations of target operating system 130 are updated.

AS a system independent of target operating system 130, micro-system 120 includes functional components which are different from functional components within a conventional operating system. Usually, computer viruses rely on processes, threads and services in an operating system to attack the operating system. Different from a conventional operating system such as Windows, Linux etc., micro-system 120 of the present invention only downloads and installs target configuration packages without relying on other processes, threads, services, processing, etc. Thus, computer viruses would not attack micro-system 120 of the present invention in a manner that they attack a traditional operating system. Therefore, micro-system 120 of the present invention can update configurations of the target system in a more secure environment.

Figure 4:
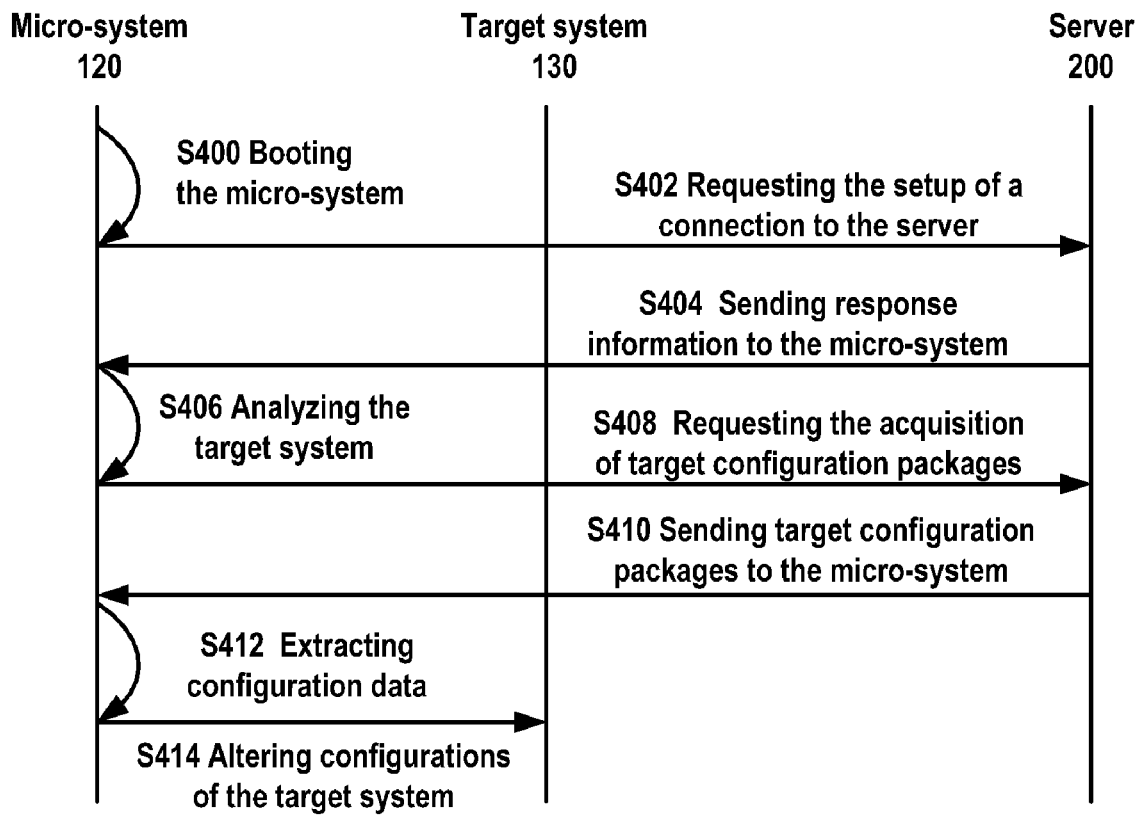
FIG. 4 shows a flowchart of a method for updating configurations of a target system according to an embodiment of the present invention.

Hereinafter, a method for updating configurations of a target system according to an embodiment of the present invention will be described in detail with reference to FIG. 4.

First, in step S400, micro-system 120 is booted when the target operating system is not running. The operating and booting of micro-system 120 can be implemented using Preboot Execution Environment (PXE) technology. PXE technology is a remote booting service technology, which can remotely configure and boot a computer before booting target operating system 130.

Specifically, after client 100 is booted, PXE bootrom sends a request such as DHCP (Dynamic Host Configuration Protocol) to server 200 when it gets control power. Upon receipt of the request, server 200 allocates a dynamic IP address, preset channel etc. to client 100, which are included in a DHCP ACK and returned to client 100. Afterwards, client 100 interacts with server 200 using the allocated IP address and preset channel through a protocol such as the Trivial File Transfer Protocol (TFTP), the Multicast Trivial File Transfer Protocol (MTFTP) or other appropriate protocol. In this way, client 100 can acquire micro-system 120 of the present invention from server 200. Next, micro-system 120 of the present invention can be booted.

In step S402, acquisition unit 121 in micro-system 120 requests the setup of a connection to server 200. In this step, acquisition unit 121 can send the request for a connection setup via network 300 to server 200 through TFTP or MTFTP.

In step S404, server 200 sends response information via network 300 to acquisition unit 121 in micro-system 120, which response information includes information associated with the communication connection.

After acquisition unit 121 receives the response information sent from server 200, preferably, the analysis unit analyzes the target system to determine target configuration packages needed by the target system in step S406. Specifically, the analysis unit can analyze configurations needed by the target system based on configuration situation of the target system as stored on storage device 106 of client 100. Additionally, target configuration packages needed by the target system can also be determined by simply using historical information on the target system's updates as stored on storage device 106. Furthermore, other technology for analyzing a target system in the prior art can be employed.

Then, acquisition unit 121 sends to server 200 a request for acquisition of target configuration packages needed by the target system in step S408. This request can include information about needed target configuration packages, such as the ID of a target configuration package to be acquired, the release time of a target configuration package to be acquired, and the like.

In step S410, server 200 receives the request for acquisition of target configuration packages from acquisition unit 121, retrieves requested target configuration packages and sends retrieved target configuration packages via network 300 to acquisition unit 121 of micro-system 120.

In step S412, extraction unit 122 obtains target configuration packages from acquisition unit 121 and processes them to extract configuration data including target configuration content and a configuration update policy etc.

In step S414, configuration updating unit 123 updates configurations of the target system by using configuration data. Specifically, configuration updating unit 123 updates original configurations of the target system on storage device 106 into a status which target configuration content indicates, by using configuration data extracted by extraction unit 122 from target configuration packages. For example, updating configurations of target operating system 130 is performed by replacing, editing, adding and deleting files and updating key assignments of the registry.

Thus, configurations of target operating system 130 are updated. Subsequently, the control power is handed over to target operating system 130 so that target operating system 130 will be booted to perform other operations which a user desires.

The operation of micro-system 120 of the present invention does not rely on other processes, threads, services or processing, which greatly reduces the probability that micro-system 120 is subjected to virus infection and attack during the configuration update.

Furthermore, since all operations are performed outside target operating system 130, micro-system 120 of the present invention will not intervene in target operating system 130. In comparison, traditional configuration updates, such as the downloading of system patches, the downloading of network packages, etc., are performed in the target operating system. Thus, traditional configuration updates will occupy a large amount of resources of the operating system and need the system to be re-booted. This will cause much trouble to users. Therefore, the present invention has the advantage of noninterference over the prior art.

According to a variation of the embodiments of the present invention, in server 200 there can be stored historical information on configuration updates of client 100 or historical information on configuration package downloading. In this case, acquisition unit 121 only needs to send a request for the acquisition of target configuration packages. Then, server 200 can determine target configuration packages needed by the client based on identification information (such as MAC (Media Access Control) address) of the client as contained in the request. Thus, step S406 can be omitted.

In this embodiment, server 200 fulfills a wide range of functions, such as the providing of the micro-system, information about configuration packages, target configuration packages, etc. However, these functions can also be distributed on multiple servers according to practical designing needs.

Although micro-system 120 of the present invention is implemented in conjunction with PXE technology in the above embodiment, the present invention is not limited thereto. Micro-system 120 of the present invention can also be stored in a storage medium such as an optical disc, floppy disc, flash memory, hard disc etc. In this way, client 100 can be booted using the storage medium.

In the above embodiment of the present invention, communication between micro-system 120 and server 200 employs the communication protocol specified in PXE technology. However, this is not crucial to the present invention, and any appropriate protocol that can implement the present invention can be employed.

In addition to the acquisition of target configuration packages from server 200, there are other manners of acquiring target configuration packages. For example, target configuration packages can be stored in a non-volatile storage medium, such as an optical disc, floppy disc, flash memory and other removable storage medium. In this case, acquisition unit 121 can directly acquire target configuration packages from the removable storage medium accessible to the system.

In the above embodiment of the present invention, the micro-system of the present invention is operated first before entering the target system. However, the present invention is not limited thereto, and the method of the present invention can be implemented when the user demands to shut down the client or after the user exits the operating system but before shuts down the client, thereby implementing configuration updates of target system.

Additionally, the present invention further provides a computer program product stored on a computer-readable medium, which comprises a code tool for implementing the method of the present invention. Said computer program product can implement the method of the present invention when executed in a computer, so that configurations of the target system are updated.

The method and micro-system of the present invention have a variety of applications, including, but not limited to, installation of operating system patches, update of virus protection tools, update of virus databases, and installation of other software update packages. Moreover, the method and micro-system of the present invention can further be used for updating security settings of a target system within a local area network. For example, target configuration packages downloaded by the micro-system can be network security setting packages stored in the server, which can contain current network security setting parameters, such as a minimum length for password, etc.

It should be appreciated to those skilled in the art that at least some parts of the present invention can be implemented as a computer program product. Computer instructions that implement the method of the present invention can be embodied in computer readable memory. Computer readable memory can include, but is not limited to, a read-only storage medium such as CD ROM, a read/write storage medium such as a floppy disc, flash memory and read/write CD ROM. In addition, it should be appreciated that the present invention can be implemented in software, hardware, firmware and a combination thereof, all of which fall in the scope of the present invention.

So far, various embodiments of the present invention have been described and shown. However, it should be appreciated to those skilled in the art the above embodiments of the present invention are only illustrative and not limiting the scope of the present invention. Various modifications and alterations can be made without departing from the essential spirit and scope of the present invention as defined in the claims.

That which is claimed is:

1. A method for updating configurations of a target system in a computer, the method comprising:
    booting, based on Preboot Execution Environment technology, a micro-system for updating configurations of a target system before booting the target system, said micro-system performing the steps of:
    acquiring target configuration packages via a network from a server, the target configuration packages indicating a post-update status of the target system;
    extracting target configuration data from said target configuration packages; and
    updating the configurations of said target system by using said target configuration data,
    wherein said micro-system is independent of said target system.

2. The method according to claim 1, wherein said target system is a computer operating system, and said target configuration packages are operating system patches or software profiles.

3. The method according to claim 1, wherein said network is an intranet.

4. The method according to claim 1, wherein said updating is at least one of replacing, editing, adding and deleting files and updating key assignments of a registry.

5. A micro-system for updating configurations of a target system in a computer, said micro-system comprising:
    acquisition unit for acquiring target configuration packages via a network from a server, the target configuration packages indicating a post-update status of the target system;
    extraction unit for extracting target configuration data from said target configuration packages; and
    configuration updating unit for updating configurations of said target system by using said target configuration data,
    wherein said micro-system is independent of said target system, and before said target system is booted, each unit in said micro-system is booted and operated based on Preboot Execution Environment technology so as to update the configurations of said target system.

6. The micro-system according to claim 5, wherein said target system is a computer operating system, and said target configuration packages are operating system patches or software profiles.

7. The micro-system according to claim 5, wherein said network is an intranet.

8. The micro-system according to claim 5, wherein said updating is at least one of replacing, editing, adding and deleting files and updating key assignments of a registry.

9. A computer program product embodied in computer readable memory comprising:
    computer readable program codes coupled to the computer readable memory for updating configurations of a target system in a computer, the computer readable program codes configured to cause the program to:
    boot, based on Preboot Execution Environment technology, a micro-system for updating configurations of a target system before booting the target system;
    acquire target configuration packages via a network from a server, the target configuration packages indicating a post-update status of the target system;
    extract target configuration data from said target configuration packages; and
    update the configurations of said target system by using said target configuration data,
    wherein said micro-system is independent of said target system.

10. The computer program product according to claim 9, wherein said target system is a computer operating system, and said target configuration packages are operating system patches or software profiles.

11. The computer program product according to claim 9, wherein said network is an intranet.

12. The computer program product according to claim 9, wherein said updating is at least one of replacing, editing, adding and deleting files and updating key assignments of a registry.

13. The computer program product according to claim 9, wherein the Preboot Execution Environment technology is a remote booting service to remotely configure and boot the computer before booting the target system with a target operating system.

14. The method according to claim 1, wherein the Preboot Execution Environment technology is a remote booting service to remotely configure and boot the computer before booting the target system with a target operating system.

15. The micro-system according to claim 5, wherein the Preboot Execution Environment technology is a remote booting service to remotely configure and boot the computer before booting the target system with a target operating system.

16. A system for updating configurations of a target system in a computer, the system comprising:
    a client computer including:
        an acquisition unit for acquiring target configuration packages via a network from a server, wherein the target configuration packages indicate a post-update status of the target system;
        an extraction unit for extracting target configuration data from said target configuration packages; and
        a configuration updating unit for updating configurations of said target system by using said target configuration data,
        wherein said micro-system is independent of said target system, and before said target system is booted, each unit in said micro-system is booted and operated based on Preboot Execution Environment technology so as to update the configurations of said target system; and
    a server computer configured to store historical information on configuration updates of the client computer and automatically determine the target configuration packages needed by the client based on identification information of the client computer and the historical information on configuration updates of the client computer.

17. The system according to claim 16, wherein the client computer is configured to send the identification information to the server computer before acquiring target configuration packages.

18. The system according to claim 16, wherein the Preboot Execution Environment technology is a remote booting service to remotely configure and boot the computer before booting the target system with a target operating system.

* * * * *